(12) United States Patent
Hsieh et al.

(10) Patent No.: US 10,983,378 B2
(45) Date of Patent: Apr. 20, 2021

(54) DISPLAY DEVICE AND ASSEMBLING AND DISASSEMBLING METHOD THEREFOR

(71) Applicant: SUZHOU RAKEN TECHNOLOGY CO., LTD., Jiangsu (CN)

(72) Inventors: Chihhung Hsieh, Jiangsu (CN); Mingtsung Ko, Jiangsu (CN)

(73) Assignee: SUZHOU RAKEN TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 16/631,836

(22) PCT Filed: Jan. 12, 2018

(86) PCT No.: PCT/CN2018/072493
§ 371 (c)(1),
(2) Date: Jan. 17, 2020

(87) PCT Pub. No.: WO2019/056667
PCT Pub. Date: Mar. 28, 2019

(65) Prior Publication Data
US 2020/0150482 A1    May 14, 2020

(30) Foreign Application Priority Data

Sep. 19, 2017 (CN) .......................... 201710845821.9

(51) Int. Cl.
*H05K 7/02* (2006.01)
*H05K 7/04* (2006.01)
(Continued)

(52) U.S. Cl.
CPC ....... *G02F 1/133308* (2013.01); *G02B 6/005* (2013.01); *H05K 5/0017* (2013.01);
(Continued)

(58) Field of Classification Search
USPC ........................................ 361/809, 807, 810
See application file for complete search history.

(56) References Cited

U.S. PATENT DOCUMENTS 7,161,643 B2 * 1/2007 Hayano ............. G02F 1/133308
349/58
9,072,167 B2 * 6/2015 Gu ....................... H05K 5/0017
(Continued)

FOREIGN PATENT DOCUMENTS

CN 103148459 A 6/2013
CN 104062782 A 9/2014
(Continued)

*Primary Examiner* — Hung S. Bui
(74) *Attorney, Agent, or Firm* — CKC & Partners Co., LLC

(57) ABSTRACT

A display device, comprising: a back plate, a middle frame, a limiting member, an optical film, and a display panel. The back plate comprises: a bottom plate, and a side wall protruding from the bottom plate. The middle frame comprises a first frame body located above the bottom plate, and a second frame body covering the side wall. The first frame body is provided with two opposite surfaces, and an opening penetrating through the two surfaces. The optical film comprises a lug portion disposed at the opening of the middle frame. The limiting member is detachably connected to the middle frame and is pluggably connected to the lug portion of the optical film. The display panel is fixed to the middle frame.

13 Claims, 18 Drawing Sheets

(51) Int. Cl.
*G02F 1/1333* (2006.01)
*F21V 8/00* (2006.01)
*H05K 5/00* (2006.01)

(52) U.S. Cl.
CPC .. *G02F 1/133314* (2021.01); *G02F 1/133317* (2021.01); *G02F 1/133325* (2021.01)

(56) References Cited

U.S. PATENT DOCUMENTS

| | | |
|---|---|---|
| 9,097,936 B2 | 8/2015 | Yu et al. |
| 9,316,864 B2 | 4/2016 | Lee et al. |
| 9,395,484 B2 * | 7/2016 | Lee ................. G02B 6/0088 |
| 9,655,258 B2 | 5/2017 | Lee et al. |
| 2016/0011364 A1 * | 1/2016 | Horiguchi ........... G02B 6/0088 |
| | | 362/606 |
| 2016/0291240 A1 * | 10/2016 | Sugimoto ............ G02B 6/0055 |
| 2018/0224594 A1 * | 8/2018 | Wu .................. G02B 6/0055 |

FOREIGN PATENT DOCUMENTS

| | | |
|---|---|---|
| CN | 104315466 A | 1/2015 |
| CN | 204477811 U | 7/2015 |
| CN | 105182605 A | 12/2015 |
| CN | 205862710 U | 1/2017 |
| TW | 201113588 A | 4/2011 |
| TW | I470311 B | 1/2015 |
| WO | 2014/134841 A1 | 9/2014 |
| WO | 2015063883 A1 | 5/2015 |

* cited by examiner

DISPLAY DEVICE AND ASSEMBLING AND DISASSEMBLING METHOD THEREFOR

RELATED APPLICATIONS

This application is a continuation of International application No. PCT/CN2018/072493, filed on Jan. 12, 2018, which claims the benefits of priority of CN application No. 201710845821.9, filed on Sep. 19, 2017, the content of which are incorporated herein by reference.

BACKGROUND

Technical Field

Embodiments of the present disclosure relate to a display device.

Description of Related Art

Liquid crystal displays (LCD) panels have been widely used in various electronic products. Because the LCD panel does not emit lights by itself, the LCD panel is installed with a backlight module which works as the light source illuminating the LCD panel in order to display images. Moreover, in order to improve luminance uniformity of the backlight module, the LCD panel is also installed with optical films which uniformize the light distributions from a light guide plate of the backlight module.

Front frames in typical display devices are omitted in some thin bezel display devices. Instead, the middle frames are exposed and act as outermost frames of such thin bezel display devices and both the display panel and the optical films are secured on the middle frame in such display devices. More particularly, the display panel is adhered to the middle frame, where the middle frame has a base and a protrusion protruding from the base toward the display panel. A lug portion of an optical film is fit on the protrusion of the middle frame and thus laid on the base of the middle frame in order to secure the optical film.

However, because the lug portion is set between the base of the middle frame and the display panel, the optical films cannot be easily removed from the middle frame after assembly process. If the optical films of a display device require maintenance or replacement, the display panel of the display device has to be detached from the middle frame, so that the optical films can be dissembled from the middle frame. Such detaching operation would very possibly damage the display panel.

Therefore, the present invention is provided to address the foregoing issues in a typical display device.

SUMMARY

One object of the present invention is to provide a display device and assembling and disassembling methods thereof.

In order to achieve the foregoing object, the structural aspect of the present invention is: a display device, comprising:

a back plate comprising a bottom plate and a sidewall protruding from the bottom plate;

a middle frame comprising a first frame body over the bottom plate and a second frame body covering the sidewall, the first frame body having two opposite surfaces and an opening penetrating through the opposite surfaces;

a display panel fixed to the middle frame;

an optical film comprising a lug portion placed in the opening of the middle frame; and a limiting member detachably connected to the middle frame, and connected to the lug portion of the optical film via the opening of the middle frame, wherein the lug portion is placed between the limiting member and the display panel; wherein a base of the limiting member is confined by the middle frame and the bottom plate.

Explanation about the foregoing embodiment is described below:

1. In the foregoing embodiment, the opening of the middle frame has two opposite sidewalls, the limiting member comprises two abutting portions respectively abutting the opposite sidewalls of the opening of the middle frame.

2. In the foregoing embodiment, the limiting member comprises a plug between the abutting portions, and the plug is inserted in an opening in the lug portion.

3. In the foregoing embodiment, the limiting member comprises a plug between the abutting portions and surrounded by the lug portion.

4. In the foregoing embodiment, the display panel is adhered to one of the opposite surfaces of the middle frame.

5. In the foregoing embodiment, the limiting member comprises a base and a plug protruding from the base, the plug is inserted in an opening in the lug portion, and the base is further away from the surface to which the display panel is adhered than the plug being.

6. In the foregoing embodiment, the limiting member comprises a base and a plug protruding from the base, the plug is inserted in an opening in the lug portion, and the base is closer to the bottom plate of the back plate than the plug being.

7. In the foregoing embodiment, the limiting member extends across the opening of the middle frame.

8. In the foregoing embodiment, the middle frame further comprises two first fixing structures respectively on two opposite sides of the opening, the limiting member comprises two second fixing structures respectively fixed to the first fixing structures.

9. In the foregoing embodiment, a light blocking portion covering the hanger portion is further comprised.

10. In the foregoing embodiment, an adhesive adhering one of the opposite surfaces of the middle frame to the display panel is further comprised.

11. In the foregoing embodiment, wherein the adhesive covers the hanger portion.

In order to achieve the foregoing object, the method aspect of the present invention is: a method of assembling a bezel-less display device, the bezel-less display device comprising a back plate, a middle frame, an optical film, at least one limiting member and a display panel, the method comprising:

orienting the middle frame in a face-down fashion, fastening the limiting member to the middle frame;

fastening the back plate to the middle frame, comprising covering a sidewall of the back plate with a portion of the middle frame;

orienting the back plate and the middle frame in a face-up fashion;

aligning at least one lug portion of the optical film with the at least one limiting member, followed by lowering the optical film such that the at least one limiting member passes through the at least one lug portion; and adhering an edge of the display panel to the middle frame.

Explanation about the foregoing embodiment is described below:

1. In the foregoing embodiment, the method further comprises placing the at least one limiting member in a recess in the middle frame prior to fastening the at least one limiting member to the middle frame.

2. In the foregoing embodiment, fastening the back plate to the middle frame further comprises: stacking the back plate on the middle frame, such that the back plate covers the at least one limiting member that is already fastened to the middle frame.

In order to achieve the foregoing object, another method aspect of the present invention is: a method of dissembling a bezel-less display device, the bezel-less display device comprising a back plate, a middle frame, an optical film, at least one limiting member and a display panel, the method comprising:

orienting the bezel-less display device in a face-down fashion, retreating the back plate from the middle frame along a retreating direction, comprising: separating a sidewall of the back plate from a portion of the middle frame that covers the sidewall;

retreating the at least one limiting member from the middle frame along the retreating direction; and retreating at least one lug portion of the optical film from where the at least one limiting member is retreated, followed by retreating the optical film from the bezel-less display device without retreating the display panel.

Explanation about the foregoing embodiment is described below:

1. In the foregoing embodiment, retreating the limiting member is such that the at least one limiting member is retreated from the at least one lug portion.

2. In the foregoing embodiment, the method further comprises: unfastening a fastener that fastens the at least one limiting member and the middle frame prior to retreating the at least one limiting member.

Operation principles and advantages of the present invention are described below:

Embodiments of the present invention additionally provide a detachable limiting member to secure the optical film. The limiting member is detachably connected to the middle frame. Therefore, if the optical film requires maintenance or replacement, the limiting member can be retreated from the middle frame first, followed by retreating the optical film without detaching the display panel from the middle frame, so as to prevent the display panel from damage.

A display device according to the present invention includes a back plate, a middle frame, a limiting member, an optical film and a display panel. The back plate includes a bottom plate and a sidewall protruding from the bottom plate. The middle frame includes a first middle frame portion over the bottom plate and a second middle frame portion covering the sidewall. The first middle frame portion has two opposite surfaces and an opening penetrating through the surfaces. The optical film includes a lug portion in the opening of the middle frame. The limiting member is detachably connected to the middle frame, and connected to the lug portion of the optical film in a pluggable manner. The display panel is fixed to the middle frame.

A method of assembling a bezel-less display device according to the present invention includes orienting the middle frame in a face-down fashion, fastening the limiting member to the middle frame, fastening the back plate to the middle frame, orienting the back plate and the middle frame in a face-up fashion, aligning a lug portion of the optical film with the limiting member, followed by lowering the optical film such that the one limiting member passes through the lug portion, and adhering an edge of the display panel to the middle frame.

A method of dissembling a bezel-less display device according to the present invention includes orienting the bezel-less display device in a face-down fashion, retreating the back plate from the middle frame along a retreating direction, retreating the limiting member from the middle frame along the retreating direction, and retreating a lug portion of the optical film from where the limiting member is retreated, followed by retreating the optical film from the bezel-less display device without retreating the display panel.

DETAILED DESCRIPTION

Figure 1:
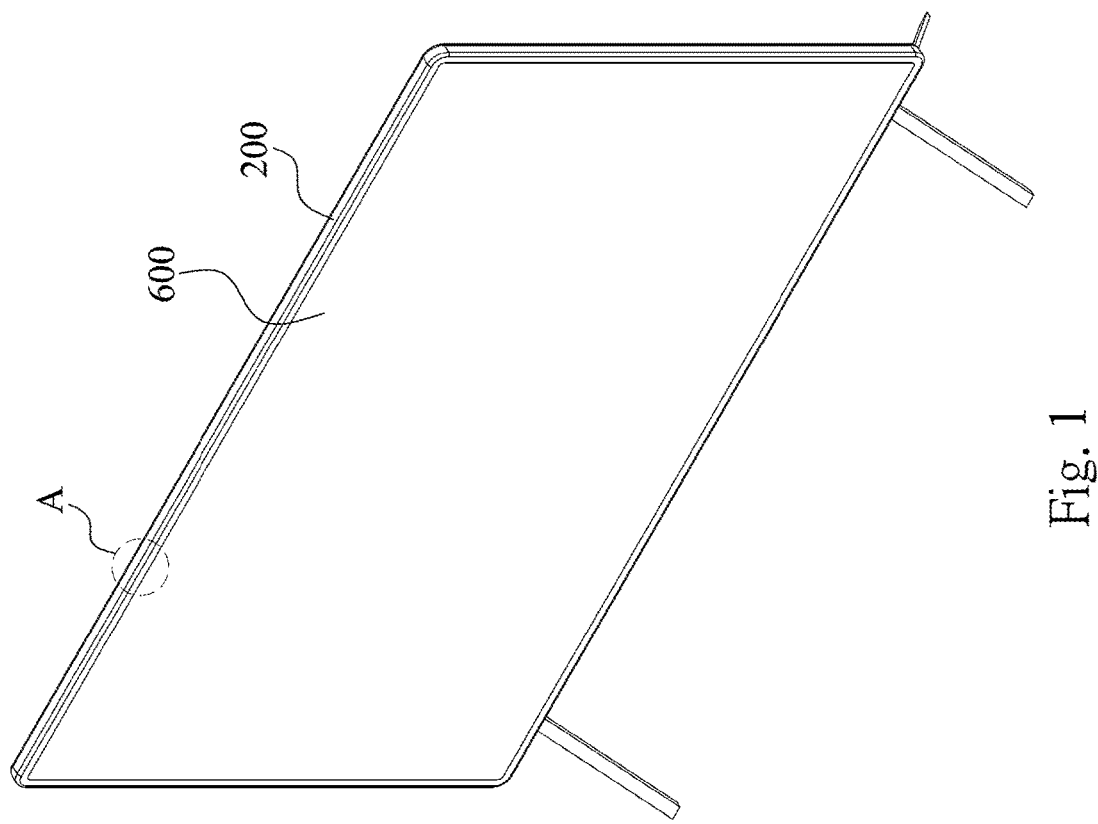
FIG. 1 is a perspective view of a display device in accordance with some embodiments of the present invention.

The present invention is described in greater detail below using the accompanying drawings and embodiments:

Hereinafter, embodiments are disclosed with reference to accompanying drawings. For the explicit description, many details in practice are provided as well in the following description. However, those skilled in the art would understand that, in some embodiments of the present invention, these details in practice are not necessary, so they shall not limit the present invention. Additionally, for simplifying the drawings, some conventional structures and elements in the drawings are depicted in a brief schematic manner. Moreover, elements in the drawings are not drawn to scale.

FIG. 1 is a perspective view of a display device 10 in accordance with some embodiments of the present invention. The display device 10 may be, for example, a television, a monitor or other suitable devices. The display device 10 includes a middle frame 200 and a display panel 600. The display panel 600 is fixed to the middle frame 200. The middle frame 200 surrounds the display panel 600 and abuts edges of the display panel 600. In some embodiments of the present invention, the display panel 600 may be, for example, a liquid crystal display panel, an electrophoretic display panel, an organic light emitting diode display panel or other suitable display panels.

Figure 2:
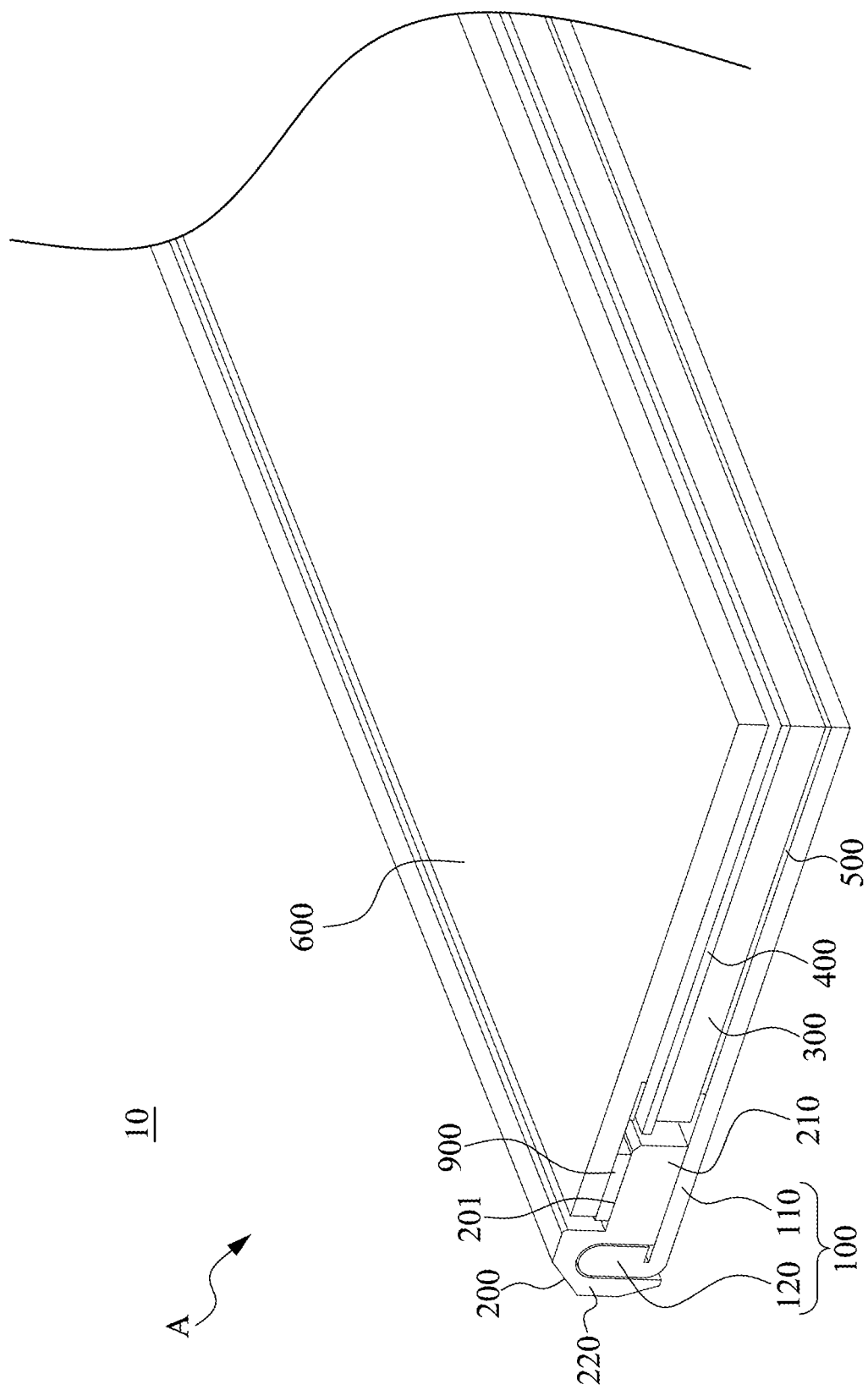
FIG. 2 is a perspective view of a region as shown in FIG. 1.
Figure 3:
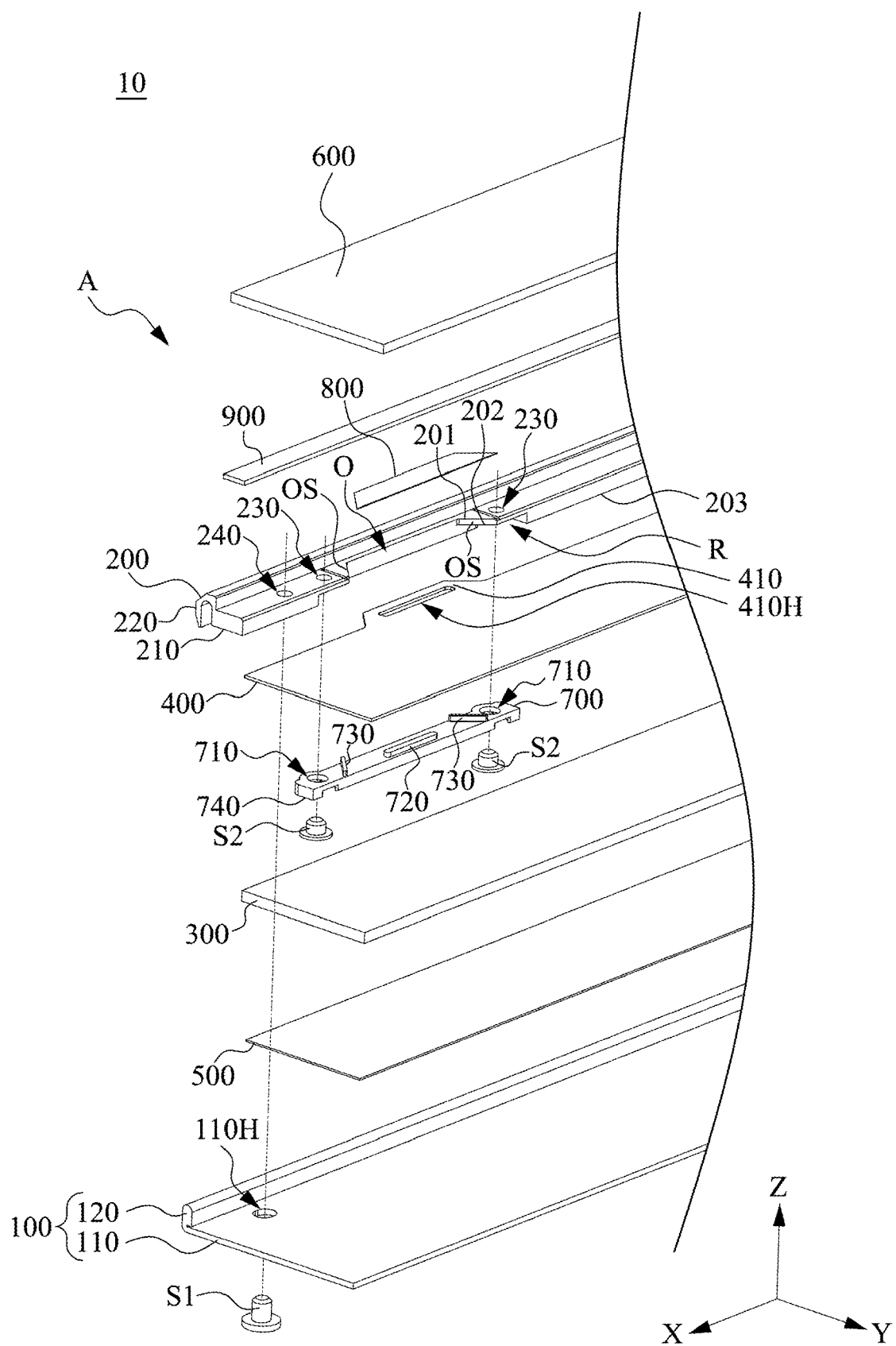
FIG. 3 is an exploded view of a region as shown in FIG. 1.

FIG. 2 is a perspective view of the region A as shown in FIG. 1, and FIG. 3 is an exploded view of the region A as shown in FIG. 1. As shown in FIGS. 2 and 3, the display device 10 further includes a back plate 100. The back plate 100 includes a bottom plate 110 and a sidewall 120 protruding from the bottom plate 110. The middle frame 200 covers the sidewall 120. By way of example, in some embodiments of the present invention, the middle frame 200 includes a first frame body 210 and a second frame body 220. The first frame body 210 extends from a sidewall of the second frame body 220 and is substantially perpendicular to the sidewall of the second frame body 220. The first frame body 210 is fixed to the bottom plate 110 of the back plate 100. For example, the bottom plate 110 has a through hole or screw hole 110H, and the middle frame 200 has a screw hole 240. Therefore, the fastener S1 can pass through the through hole 110H and be fastened into the screw hole 240 in the middle frame 200, which in turn fasten the first frame body 210 to the bottom plate 110. In some embodiments of the present invention, the fastener S1 may be, for example, a screw or a bolt. The second frame body 220 of the middle frame 200 straddles the sidewall 120 to cover it.

The display panel 600 is supported by the first frame body 210 of the middle frame 200, and sidewalls of the display panel 600 are surrounded by the second frame body 220 and thus remain unexposed. In some embodiments of the present invention, the bottom surface of the display panel 600 is fixed to the top surface of the first frame body 210. For example, the bottom surface of the display panel 600 is adhered to the top surface of the first frame body 210. In some embodiments of the present invention, sidewalls of the display panel 600 are fixed to inner sidewalls of the second frame body 220. For example, the sidewalls of the display panel 600 are adhered to the inner sidewalls of the second frame body 220. The second frame body 220 is exposed to an external environment without covered by other frames, such as the front frames of the conventional display devices. In other words, the display device 10 can be also referred to as a bezel-less display device. In this manner, a reduced thickness and a reduced width of the bezel around the display panel 600 of the display device 10 can be achieved, which also conforms to the emerging trends of thin or narrow bezel designs of the consumer display devices and provides advantages thereof.

The display device 10 further includes a light guide plate 300 and a reflective sheet 500. The reflective sheet 500 is disposed on the bottom plate 110. The light guide plate 300 covers the reflective sheet 500 and can thus receive lights reflected from the reflective sheet 500. The light guide plate 300 and the reflective sheet 500 are accommodated in a space defined in the second frame body 220. A light source, not shown in the figures, is set on at least one inner side of the display device 10. The light source, the light guide plate 300 and the reflective sheet 500 in combination serve as an edge-lit type backlight module which guides the light emitted from the light source to the display panel 600 above the light guide plate 300 in FIGS. 2 and 3.

In some embodiments of the present invention, the top surface of the reflective sheet 500, which is the surface of the reflective sheet 500 closest to the light guide plate 300, is made of a material with high reflectivity, such as silver or other suitable materials. For example, the top surface of the reflective sheet 500 is coated with a silver coating layer. In some embodiments of the present invention, the light guide plate 300 is made of a light-transmissive material, so that lights can travel through the light guide plate 300 and leave the light guide plate 300 from the top surface of the light guide plate 300, which is the surface of the light guide plate 300 closest to the display panel 600. The lights can enter into the light guide plate 300 through other surfaces of the light guide plate 300, such as the surfaces of the light guide plate 300 close to the light source or the reflective sheet 500. The light guide plate 300 may be made of, for example, polymethyl methacrylate (PMMA), polycarbonates (PC), polyethylene terephthalate (PET), glass, or other suitable light-transmissive materials.

In some embodiments of the present invention, the display device 10 further includes an optical film 400. The optical film 400 is between the light guide plate 300 and the display panel 600. The optical film 400 modifies the distribution of the lights transmitted from the light guide plate 300 to the display panel 600, such that the distribution of the lights leaving the optical film 400 will be more uniform than the distribution of the lights entering the optical film 400. In some embodiments of the present invention, the optical film 400 is a prism sheet that has a plurality of nano-scaled optical microstructures, which are not shown in the figures. These microstructures are spread on a top surface of the optical film 400, which is the side of the optical film 400 closest to the display panel 600. The microstructures may also be spread on the bottom surface of the optical film 400, which is the side of the optical film 400 closest to the light guide plate 300, so as to further modify the distribution of lights. In some embodiments of the present invention, the display device 10 may include one or more optical films 400.

Figure 4:
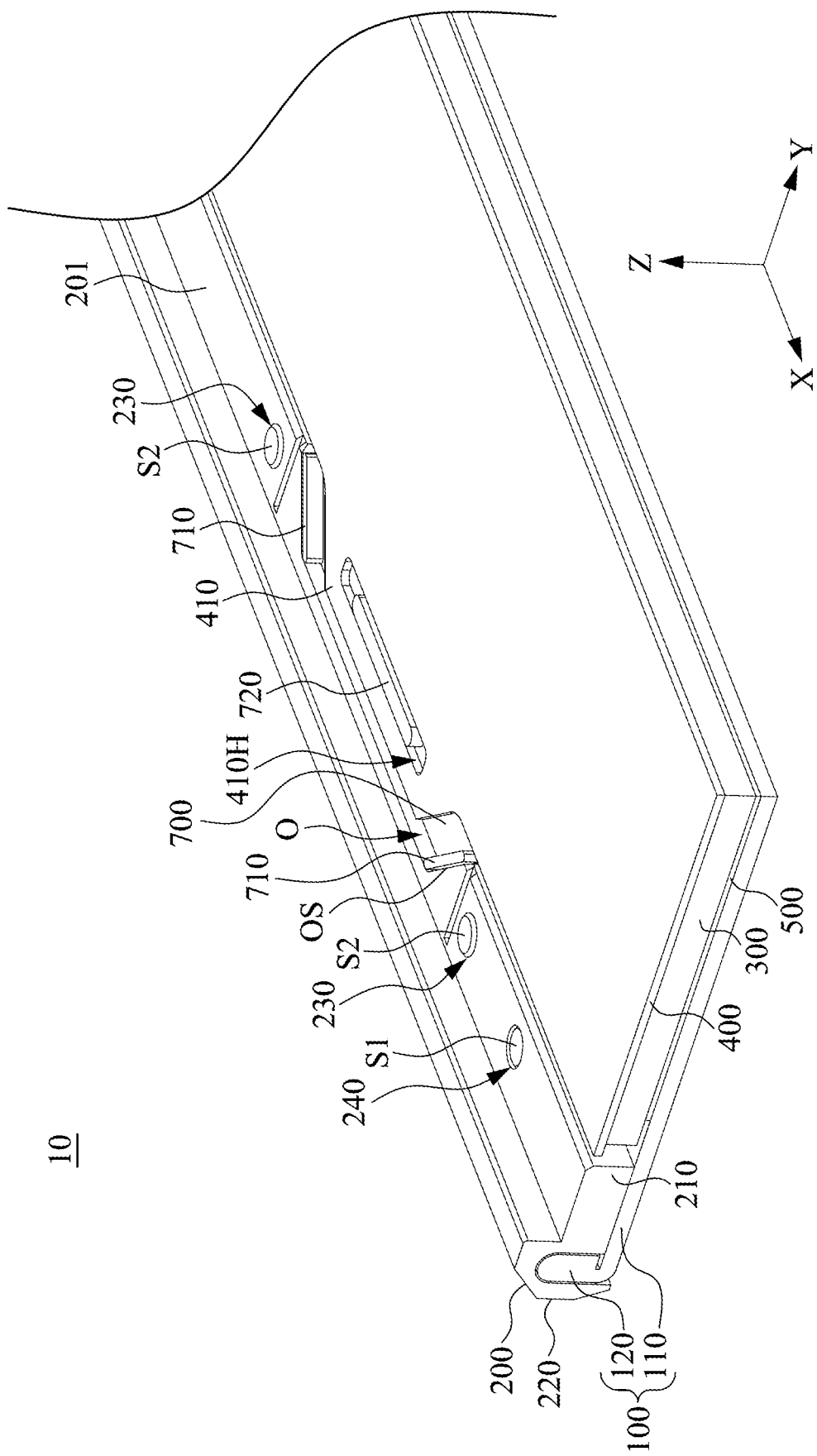
FIG. 4 is a perspective view of an assembled structure of the middle frame, the optical film, and the limiting member in accordance with some embodiments of the present invention.

Referring to FIGS. 3 and 4, the display device 10 further includes a limiting member 700 which secures the optical film 400 to the middle frame 200. The FIG. 4 illustrates a perspective view of an assembled structure of the middle frame 200, the optical film 400 and the limiting member 700. The first frame body 210 of the middle frame 200 includes two opposite surfaces 201, 202 and an opening O. The opening O penetrates through the opposite surfaces 201 and 202. The optical film 400 includes a lug portion 410. The lug portion 410 is within the opening O penetrating through the opposite surfaces 201 and 202 of the middle frame 200, so that no portion of the middle frame 200 is between the lug portion 410 and the underlying bottom plate 110. The limiting member 700 is between the bottom plate 110 and the lug portion 410. The lug portion 410 is connected to the limiting member 700 in a pluggable manner. The limiting member 700 is detachably connected to the middle frame 200.

By way of example, in some scenarios the limiting member 700 is assembled to the middle frame 200, and in some other scenarios the limiting member 700 is removed from the middle frame 200. When the limiting member 700 is assembled to the middle frame 200, part of the limiting member 700 is inserted into the lug portion 410 of the optical film 400 to fix each other. When the limiting member 700 is removed from the middle frame 200, the limiting member 700 is retreated and thus detached from the lug portion 410. As a result, the optical film 400 will be freed from confinement by the limiting member 700 and/or middle frame 200. In this way, the optical film 400 can be removed from the display device 10 for maintenance or replacement. More particularly, because no portion of the middle frame 200 is between the optical film 400 and the bottom plate 110, the optical film 400 can be removed without interference from the middle frame 200 when the back plate 100, the reflective sheet 500, the light guide plate 300 and the limiting member 700 are removed. In this way, the optical film 400 can be removed without detaching the display panel 600 from the middle frame 200, which in turn will prevent the display panel 600 from damage caused by removing the optical film 400.

In some embodiments of the present invention, as illustrated in FIGS. 3 and 4, the detachable connection between the middle frame 200 and the limiting member 700 is achieved by the first fixing structures 230, the second fixing structures 710 and the fasteners S2. More particularly, the middle frame 200 includes at least two first fixing structures 230 on opposite sides of the opening O, respectively. For example, a first fixing structure 230, the opening O, and another first fixing structure 230 are arranged along a lengthwise direction of the middle frame 200, which is shown as the X direction in FIG. 3. The limiting member 700 includes at least two second fixing structures 710 fixed to the at least two first fixing structures 230, respectively. For example, the first fixing structures 230 are screw holes, the second fixing structures 710 are through holes or screw holes. The first fixing structures 230 are fixed and connected to the second fixing structures 710 by the fasteners S2, respectively, so that the limiting member 700 can be stably assembled to the middle frame 200. More particularly, the fasteners S2 can pass through the respective second fixing structures 710 of the limiting member 700 and then be fastened in the respective first fixing structures 230 of the middle frame 200. The fasteners S2 can be released and removed from the first and second fixing structures 230 and 710, so that the limiting member 700 can be detached from the middle frame 200. In some embodiments of the present invention, the fasteners S2 may be, for example, screws or bolts.

In some embodiments of the present invention, as illustrated in FIGS. 3 and 4, the limiting member 700 extends across the opening O of the middle frame 200, so that the two second fixing structures 710 of the limiting member 700 can be respectively fixed to the two first fixing structures 230 on opposite sides of the opening O. The limiting member 700 has a length greater than a length of the opening O, so that the limiting member 700 can span across the opening O of the middle frame 200.

In some embodiments of the present invention, as shown in FIG. 3, the middle frame 200 has a recess R formed in the surface 203 of the first frame body 210 facing toward the bottom plate 110. The limiting member 700 can be detachably disposed in the recess R, which connects to the opening. Therefore, when the limiting member 700 is assembled to the middle frame 200 that the top surface of the limiting member 700 is toward to the opening O of the middle frame 200, the recess R can accommodate the limiting member 700 and prevent the limiting member 700 from excessively protruding from the surface 203 of the first frame body 210. In some embodiments of the present invention, the limiting member 700 has a base 740 which has a shape fitting the recess R. The second fixing structures 710 are through holes or screw holes penetrating through two opposite surfaces of the base 740. The base 740 has a thickness not greater than a depth of the recess R in the middle frame 200. Therefore, when the limiting member 700 is assembled to the middle frame, the limiting member 700 does not protrude below the surface 203 of the middle frame 200, i.e. the structures on the top surface of the base 740 will be in the opening O or protrude through the opening O. As a result, the base 740 of the limiting member 700 is confined by the recess R of the middle frame 200 and the back plate 110.

In some embodiments of the present invention, as illustrated in FIGS. 3 and 4, the opening O of the middle frame 200 has two opposite sidewalls OS. The limiting member 700 includes two abutting portions 730. The abutting portions 730 protrude from a top surface of the base 740, which is the surface of the base 740 closest to the middle frame 200. When the limiting member 700 is assembled to the middle frame 200, the two abutting portions 730 of the limiting member 700 respectively abut against the two sidewalls OS of the opening O, which in turn will confine the relative position between the middle frame 200 and the limiting member 700.

In some embodiments of the present invention, as illustrated in FIGS. 3 and 4, the pluggable connection between the lug portion 410 of the optical film 400 and the limiting member 700 can be achieved by a plug 720 of the limiting member 700 and the opening 410H of the lug portion 410. In details, the limiting member 700 has a plug 720 protruding from the base 740. The plug 720 is designed to be inserted into the opening 410H of the lug portion 410, such that the plug 720 is surrounded by the lug portion 410 while the base 740 is below the lug portion 410. As a result, the plug 720 confines degrees of freedom (DOF) of the lug portion 410 in X-direction and Y-direction, so as to limit or fix the X-directional position and the Y-directional position of the lug portion 410. The base 740 confines the DOF of the lug portion 410 in Z-direction, so as to limit or fix the Z-directional position of the lug portion 410.

In some embodiments of the present invention, as illustrated in FIGS. 3 and 4, the plug 720 is between the two abutting portions 730. Therefore, when the abutting portions 730 respectively abut against the opposite sidewalls OS of the opening O in the middle frame 200, the plug 720 is within the opening O and can be inserted into the opening 410H of the lug portion 410 without interfering with the middle frame 200.

In some embodiments of the present invention, as illustrated in FIGS. 3 and 4, the opening 410H of the lug portion 410 has a length along the X-direction less than the length of the opening in the middle frame 200. In some embodiments of the present invention, the plug 720 has a length along the X-direction less than the length of the opening 410H of the lug portion 410, so that the plug 720 can be fixed in the opening 410H in a clearance fit manner, such that a clearance or gap remains between the plug 720 and the opening 410H when the plug 720 is inserted in the opening 410H. In some other embodiments of the present invention, the plug 720 can also be fixed in the opening 410H in a transition fit or interference fit manner.

In some embodiments of the present invention, the middle frame 200 is opaque in order to prevent light leakage from the middle frame 200. However, the lug portion 410 of the optical film 400 is inserted in the opening O and not covered by the middle frame 200, which may cause light leakage, too. Therefore, in some embodiments of the present invention, the display device 10 further includes a light blocking portion 800 covering the lug portion 410 to prevent light leakage. In some embodiments of the present invention, the light blocking portion 800 may be made of, for example, mylar or other suitable opaque materials.

In some embodiments of the present invention, the display panel 600 is adhered to the middle frame 200 and thus fixed with the middle frame 200. For example, as shown in FIG. 3, the display device 10 further includes an adhesive 900. Two opposite surfaces of the adhesive 900 respectively adhere to the front surface 201 of the middle frame 200 and the display panel 600, but not adhere to the limiting member 700 or the optical film 400 in the opening O. The base 740 of the limiting member 700 is farther away from the front surface 201 of the middle frame 200 than the plug 720 and not adhered. In other words, the base 740 of the limiting member 700 is closer to the bottom plate 110 than the plug 720. Therefore, when releasing the limiting member 700 or the optical film 400 from the middle frame 200, the base 740 can be pulled in a direction away from the display panel 600 after the back plate 100 is removed, and the plug 720 will be retreated from the opening 410H of the optical film 400. The adhesive 900 may be, for example, a double-sided tape, a double-sided foam tape, a liquid or solid adhesive, or other suitable adhesives.

In some embodiments of the present invention, the adhesive 900 extends along the surface 201 and across the lug portion 410 of the optical film 400 in the opening O. In other words, the adhesive 900 covers the lug portion 410, and thus the adhesive 900 can prevent light leakage as well. In such embodiments, because the light leakage of the lug portion 410 can be reduced by the adhesive 900, the light blocking portion 800 can be omitted. In some embodiments of the present invention, the adhesive 900 is not formed vertically above the lug portion 410 or does not cover the lug portion 410, so as to prevent the adhesive 900 unwanted adhere to the lug portion 410 of the optical film 400, which will increase difficulty of releasing the optical film 400 from the middle frame 200.

Figure 5:
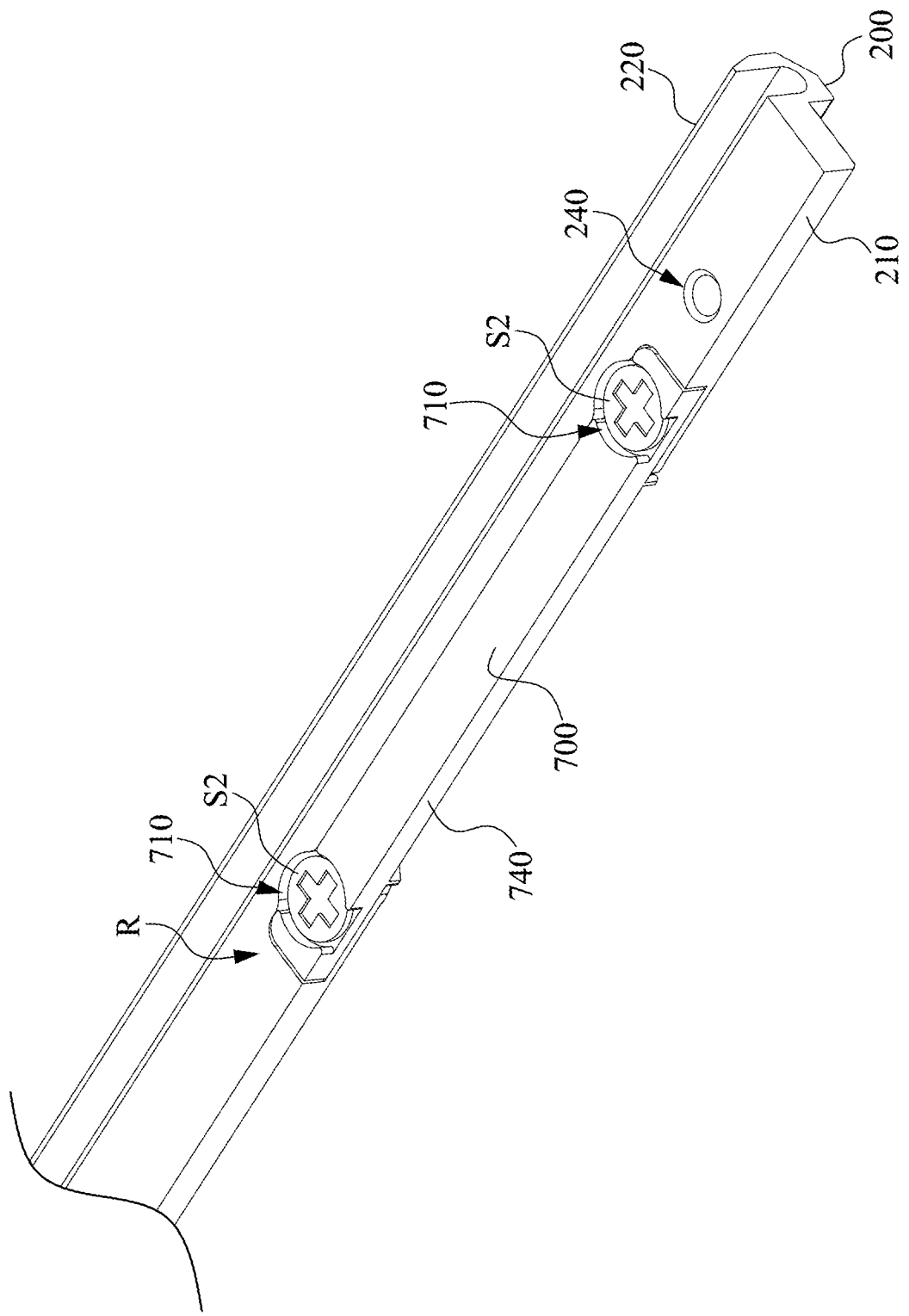
FIGS. 5-11 illustrate a method of assembling the display device.

FIGS. 5-11 illustrate a method of assembling the foregoing display device 10. At first, the middle frame 200 is oriented in a face-down fashion, as illustrated in FIG. 5. Thereafter, the limiting member 700 is placed in the recess R in the middle frame 200. Afterwards, the limiting member 700 and the middle frame 200 are fastened using fasteners S2.

Figure 6:
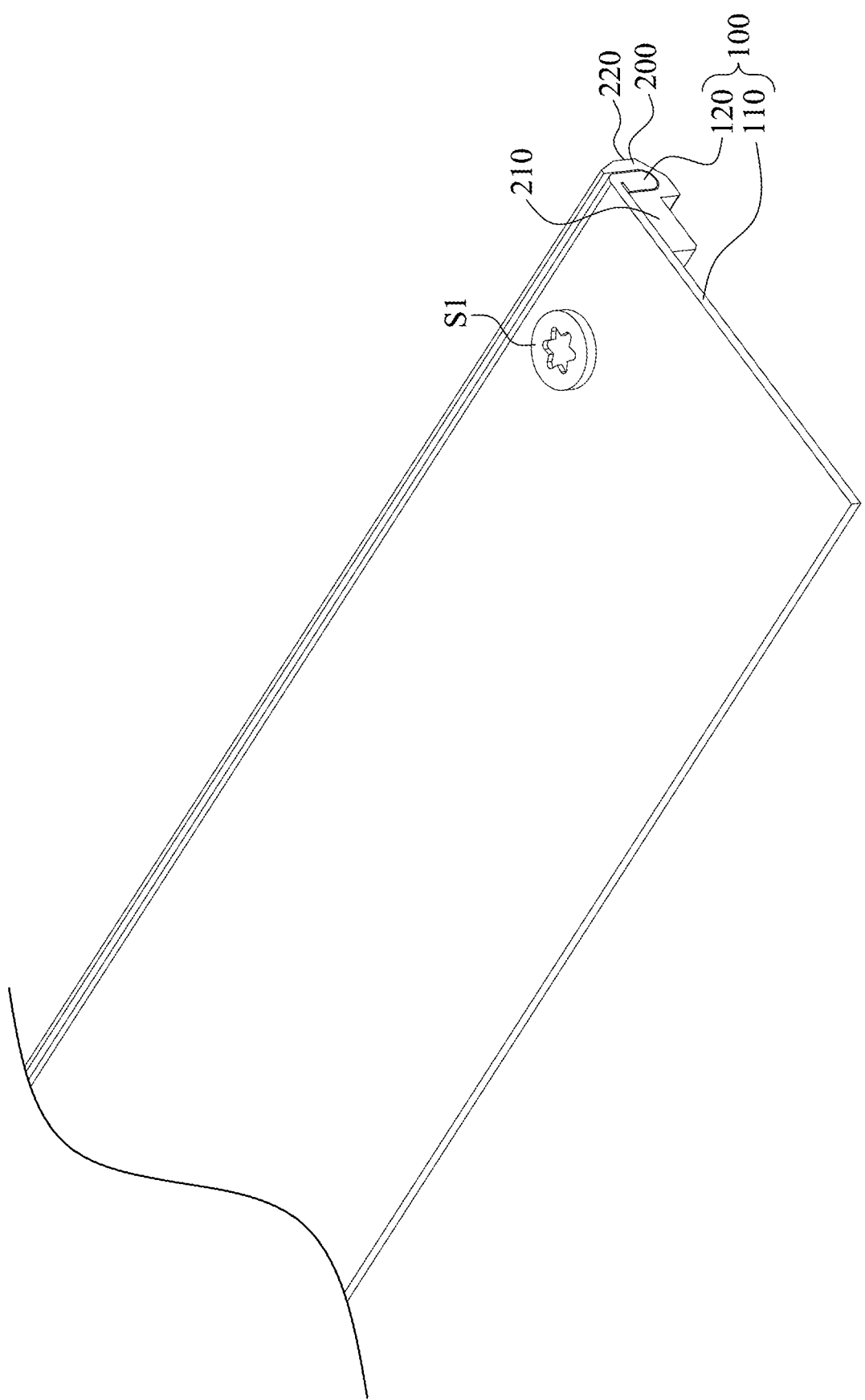

Next, as illustrated in FIG. 6, the back plate 100 is placed on the middle frame 200, wherein the sidewall 120 of the back plate 100 is inserted into a groove in the second frame body 220 of the middle frame 200, and the bottom plate 110 of the back plate 100 is stacked on the first frame body 210 of the middle frame 200 to cover the limiting member 700 which is already fastened to the middle frame 200. As a result, the base 740 of the limiting member 700 is confined by the recess R of the middle frame 200 and the back plate 110.

Figure 7:
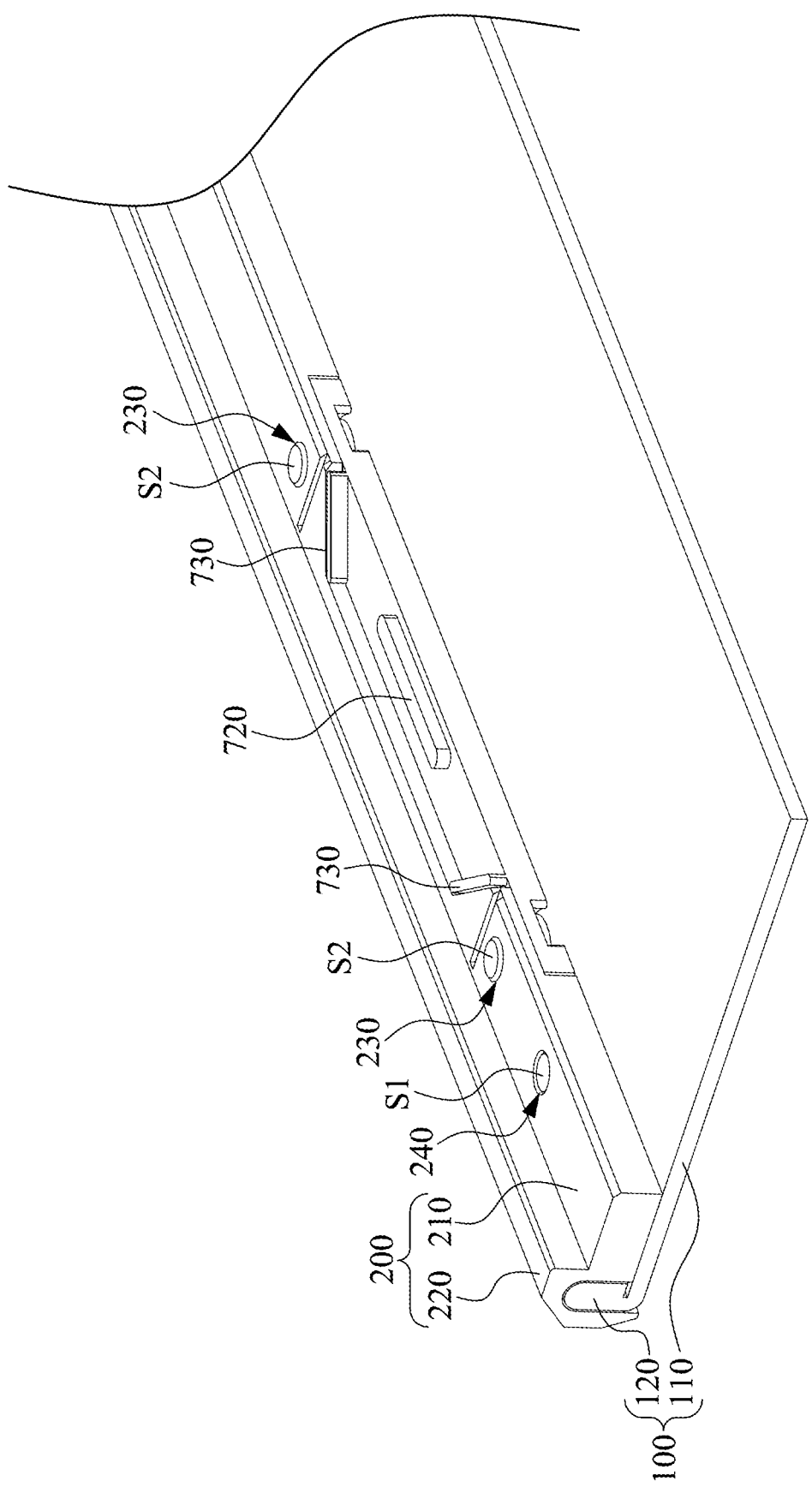
Figure 8:
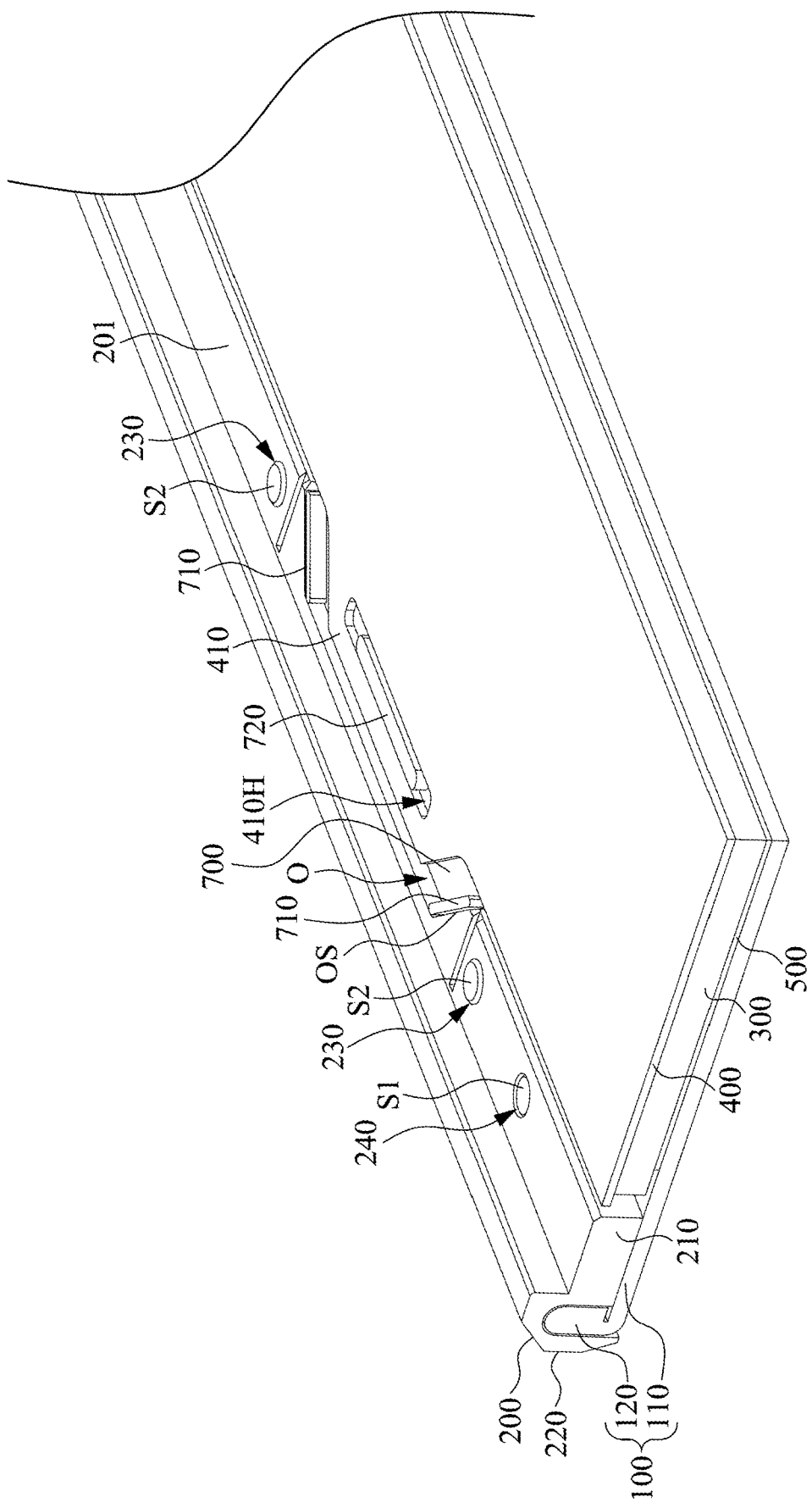

Next, as illustrated in FIG. 7, the semi-finished structure of FIG. 6 is flipped over, such that the back plate 100 is oriented in a face-up fashion. Afterwards, as illustrated in FIG. 8, the reflective sheet 500 is placed on the bottom plate 110, the light guide plate 300 is placed on the reflective sheet 500, and the optical film 400 is placed on the light guide plate 300. During placing the optical film 400, the opening 410H of the lug portion 410 is aligned with the plug 720 of the limiting member 700, and then the optical film 400 is then lowered such that the plug 720 can pass through the opening 410H of the lug portion 410. Meanwhile, the lug portion 410 will be placed in the opening O of the middle frame 200.

Figure 9:
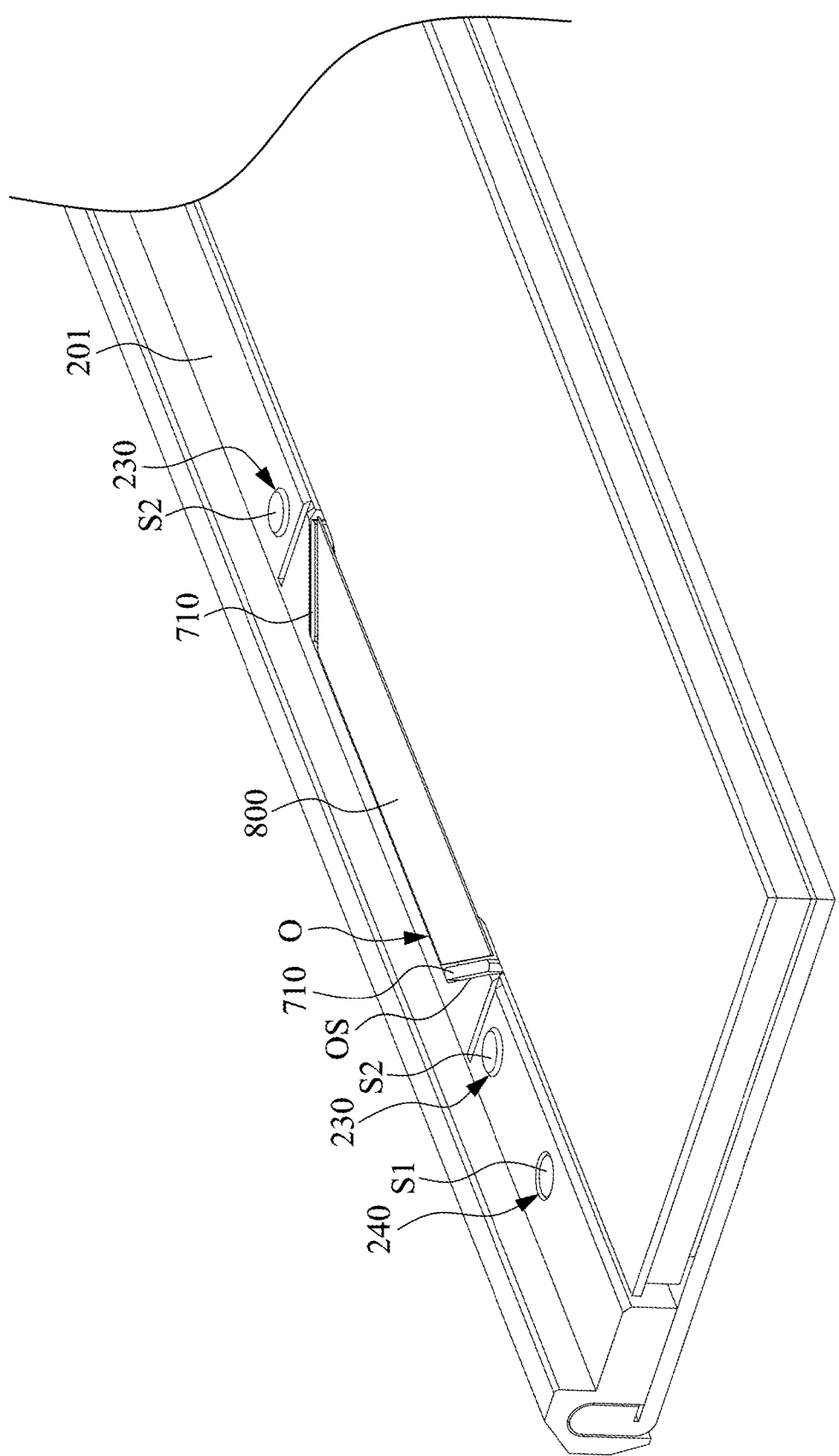
Figure 10:
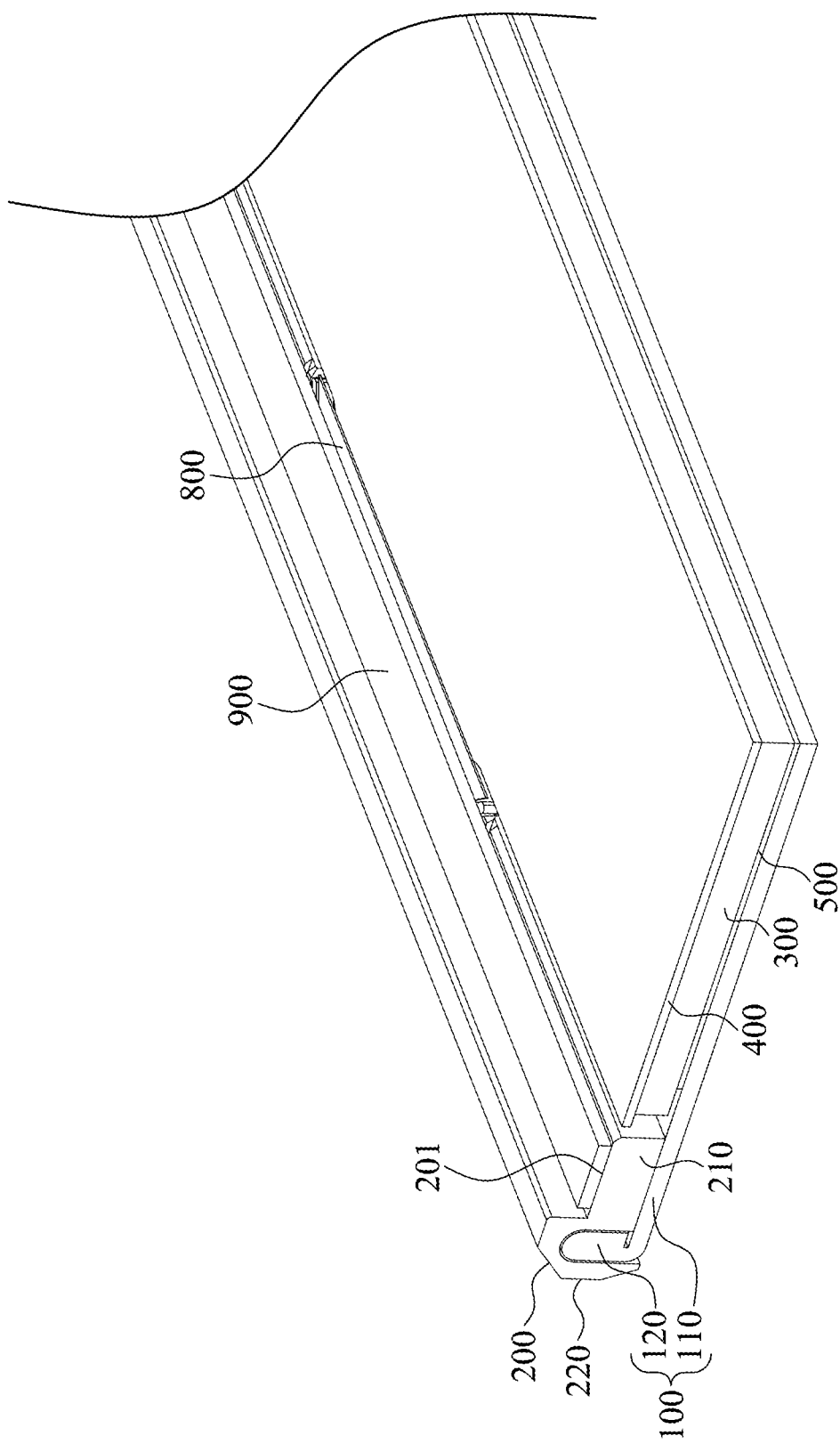
Figure 11:
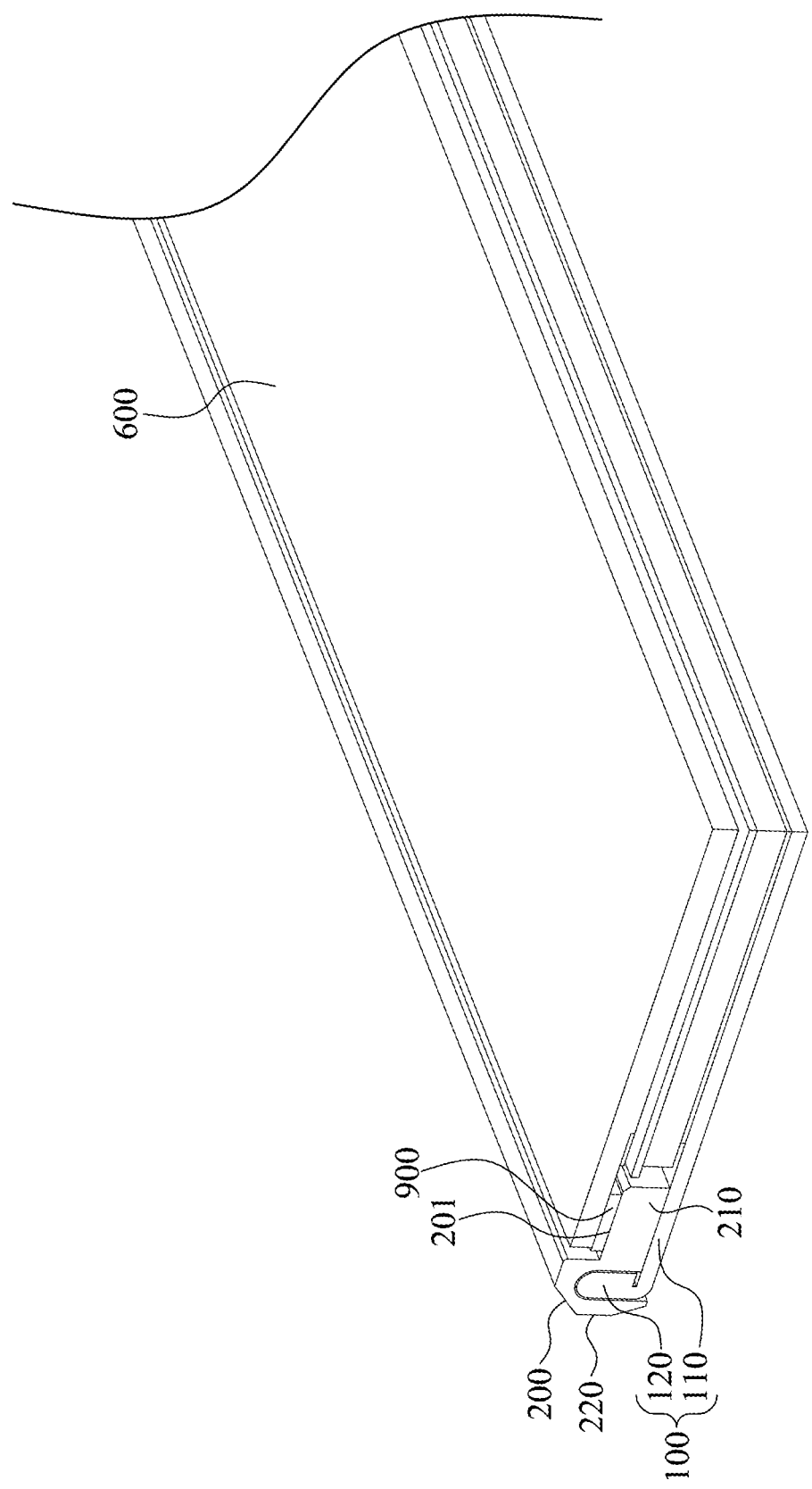

Next, as illustrated in FIG. 9, the lug portion 410 is covered with the light blocking portion 800 to prevent light leakage. Then, as illustrated in FIG. 10, the adhesive 900 is adhered to the surface 201 of the first frame body 210 of the middle frame 200. Afterwards, as illustrated in FIG. 11, the display panel 600 is placed such that the edge of the display panel 600 covers and contacts the adhesive 900. In this way, the display panel 600 and the middle frame 200 can be fixed by the adhesive 900.

Figure 12:
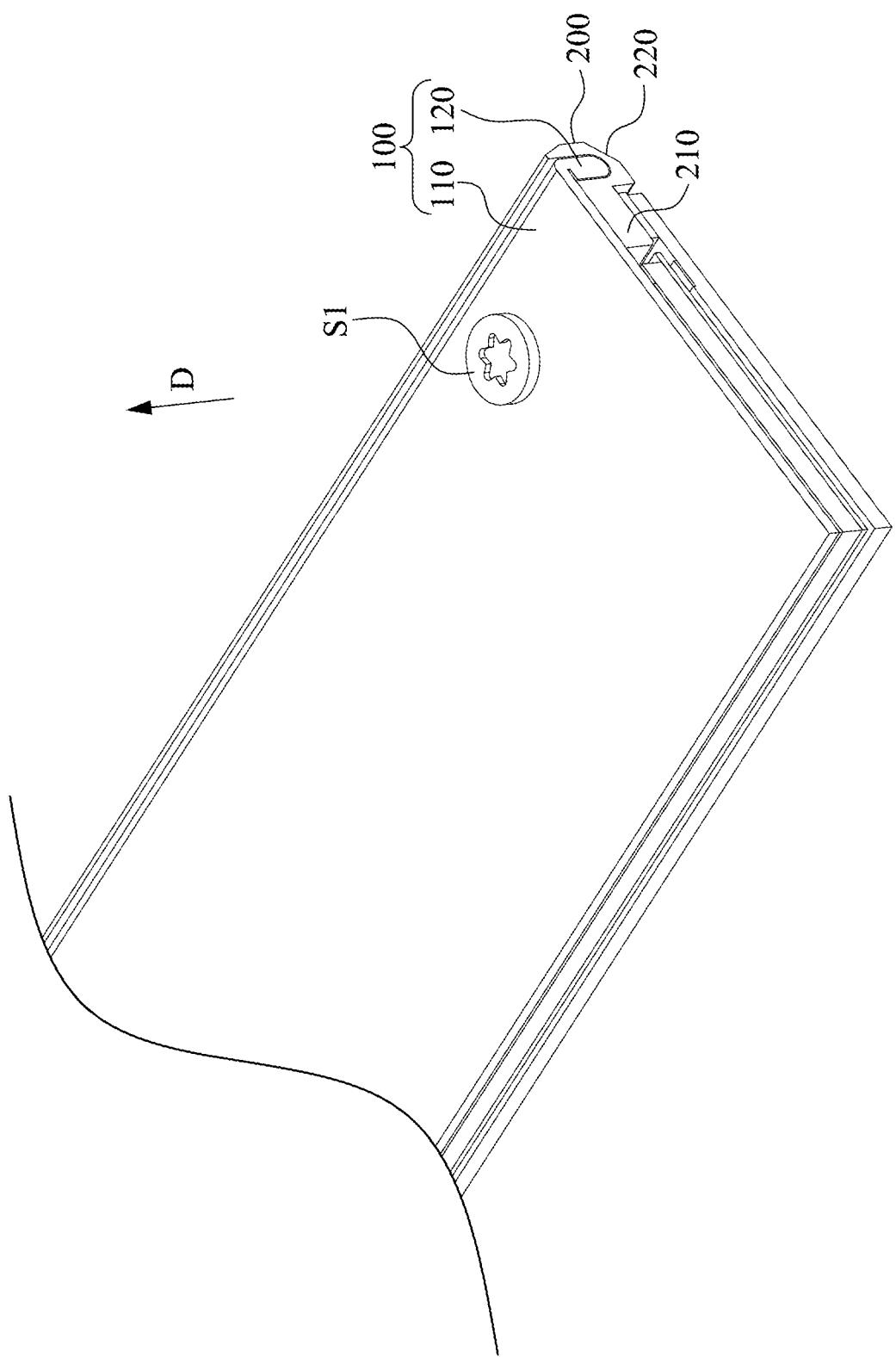
FIGS. 12-15 illustrate a method of dissembling the display device.
Figure 13:
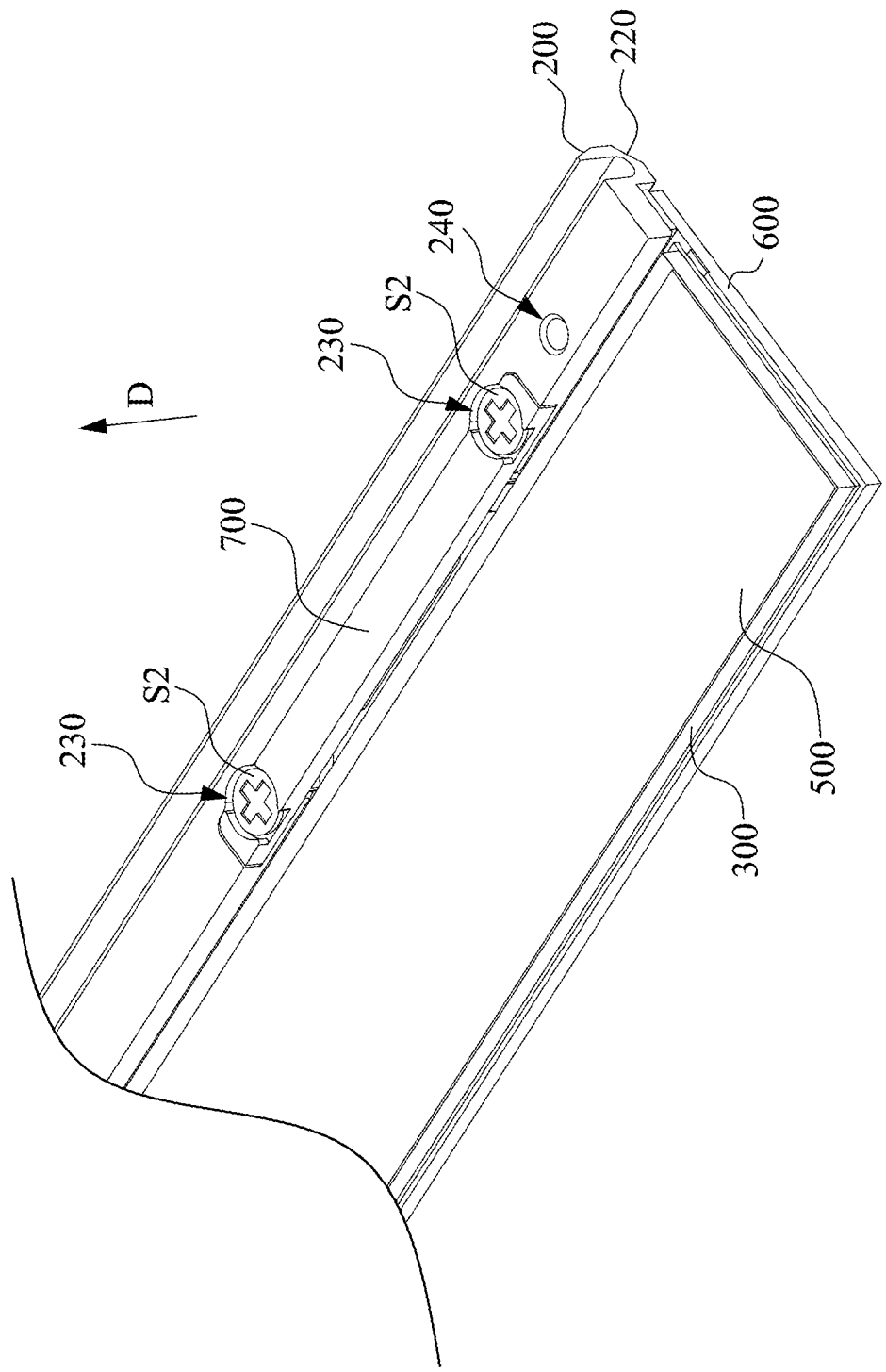

FIGS. 12-15 illustrate a method of dissembling the foregoing display device 10. At first, as illustrated in FIG. 12, the display device is oriented in a face-down fashion. The fastener S1 is unfastened and released along a releasing direction D. Then, the back plate 100 is removed along the removing direction D and the interior space of display device 10 is exposed, as illustrated in FIG. 13.

Next, as illustrated in FIG. 13, the fasteners S2 are released along the releasing direction D, and the limiting member 700 is pulled and removed along the removing direction D. In this way, the limiting member 700 is retreated from the opening 410H of the lug portion 410 and the lug portion 410 of the optical film 400 is exposed, as illustrated in FIG. 14.

Figure 14:
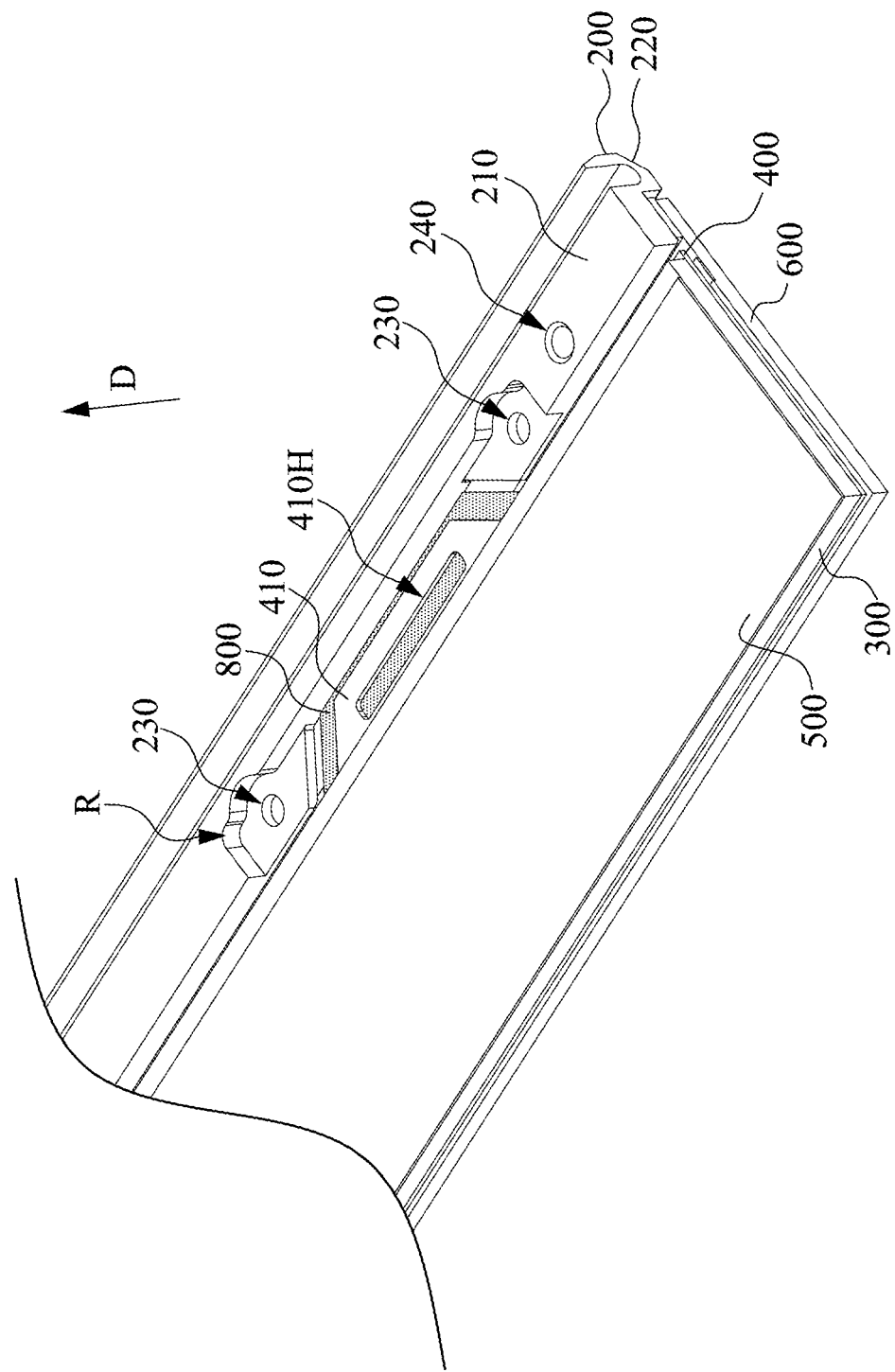
Figure 15:
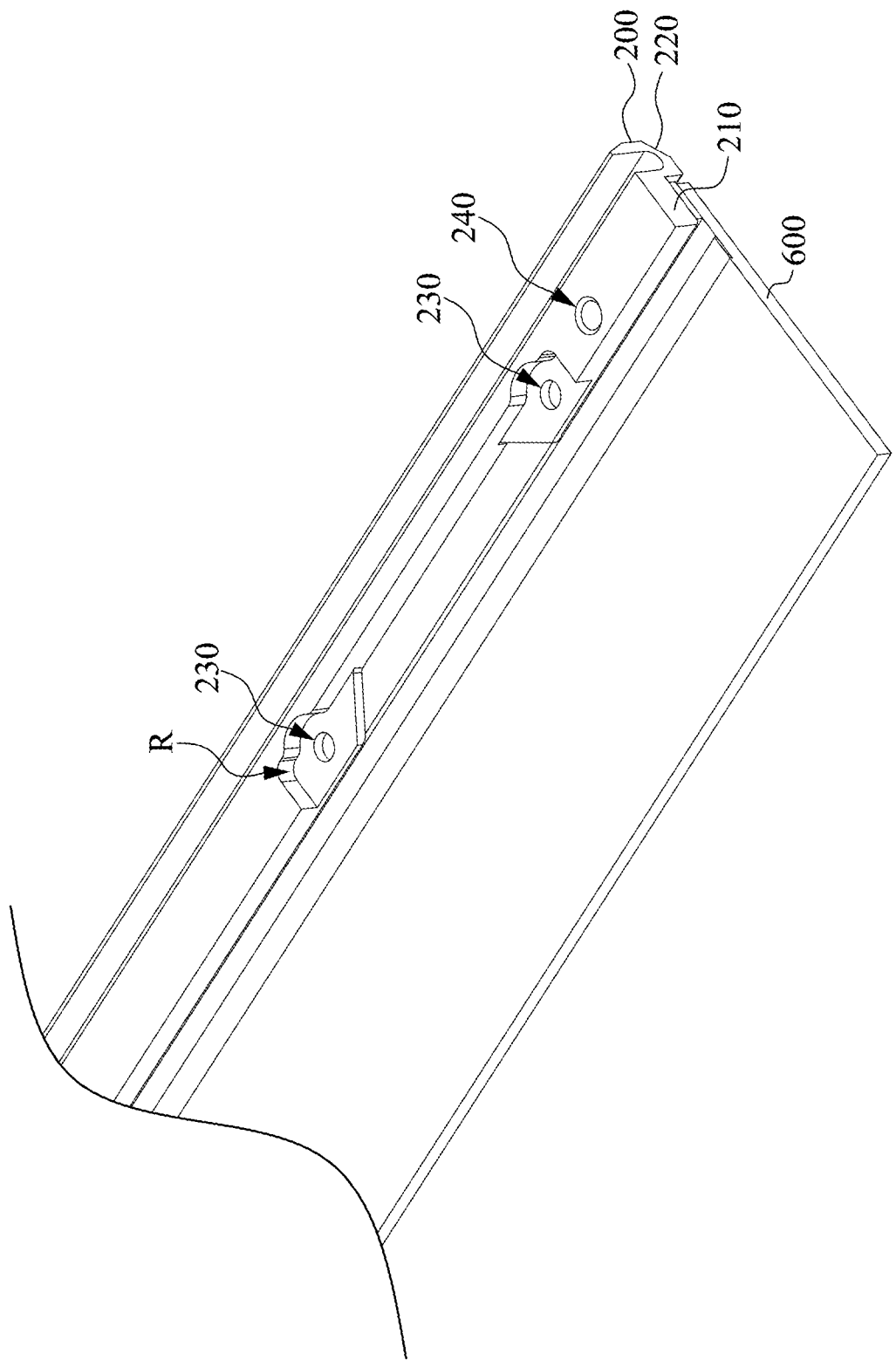

Next, as illustrated in FIG. 14, the reflective sheet 500, the light guide plate 300 and the optical film 400 are removed sequentially along the removing direction D, and the resultant structure is illustrated in FIG. 15. As illustrated in FIGS. 13-15, after the limiting member 700 is removed, the lug portion 410 is free from confinement in the removing direction D, so that the lug portion 410 can be retreated from the recess R, where the limiting member 700 is removed, along the removing direction D. Then, the optical film 400 can be removed without detaching the display panel 600 from the middle frame 200. As a result, the embodiments of the present invention provide the designs of the display devices that the optical film 400 can be removed from the display devices while the display panel 600 remains adhered to the middle frame 200. In other words, the embodiments of the present invention provide the designs of the display devices and process for removing the optical film 400 from the display devices without disassembling the display panel 600 firstly.

Figure 16:
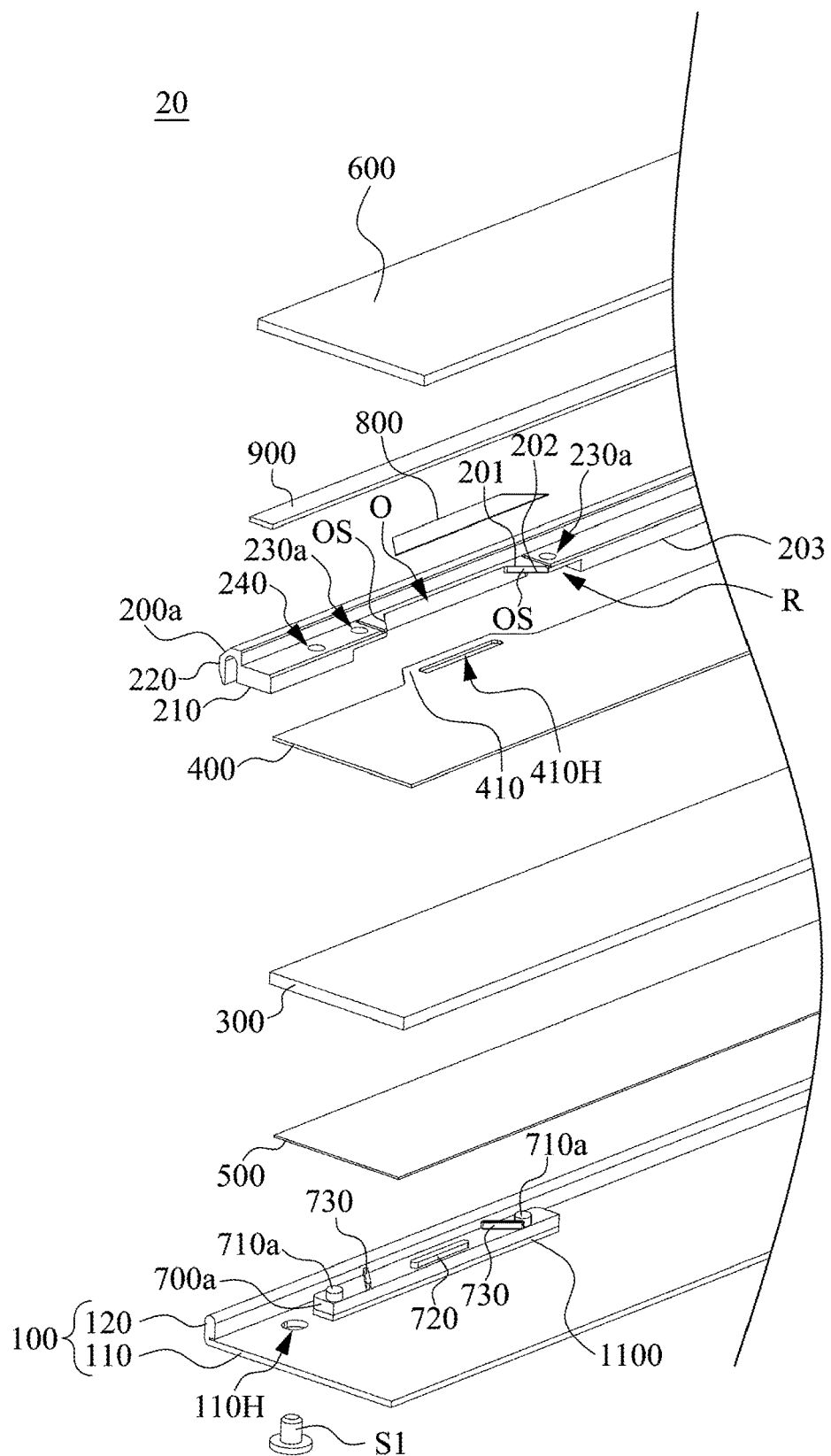
FIG. 16 is an exploded view of a display device in accordance with some embodiments of the present invention.

FIG. 16 is an exploded view of a display device 20 in accordance with some embodiments of the present invention. The display device 20 differs from the aforementioned display device 10 at least in that the limiting member 700a is fixed to the back plate 100. For example, the limiting member 700a can be adhered to the top surface of the bottom plate 110 of the back plate 100 as shown in FIG. 16. The display device 20 may also include an adhesive layer 1100 between the limiting member 700a and the top surface of the bottom plate 110, so as to adhere them together.

Moreover, in the embodiments depicted in FIG. 16, the second fixing structures 710a of the limiting member 700a are pin structures, and the first fixing structures 230a of the middle frame 200a are holes corresponding to the pin structures. The pin structures can be inserted and fixed into the holes in a clearance fit manner, a transition fit manner, or interference fit manner. Other elements as shown in FIG. 16 are described as the aforementioned embodiments previously.

Figure 17:
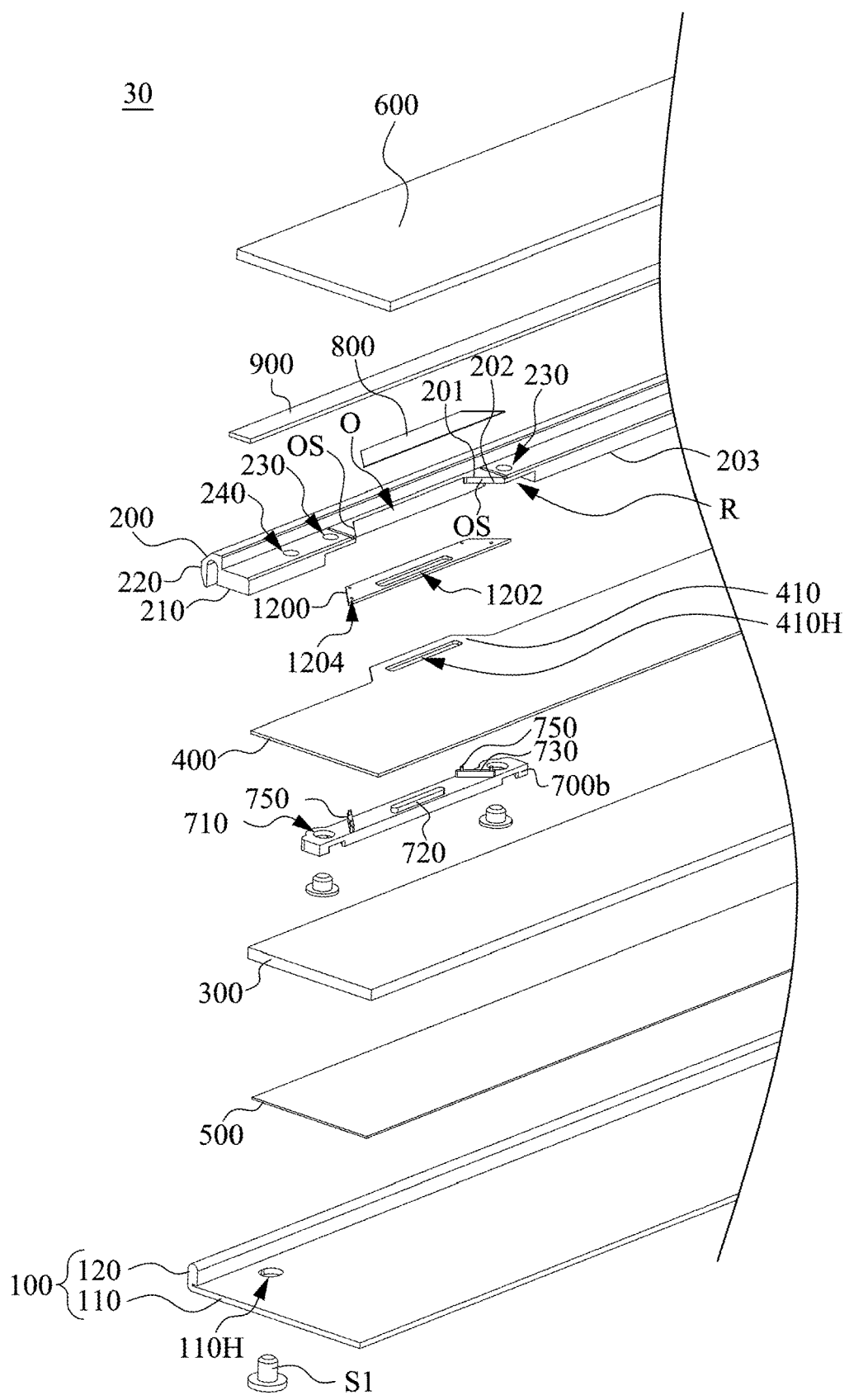
FIG. 17 is an exploded view of a display device in accordance with some embodiments of the present invention.

FIG. 17 is an exploded view of a display device 30 in accordance with some embodiments of the present invention. The display device 30 differs from the foregoing display device 10 at least in that the display device 30 further includes an auxiliary limiting member 1200 detachably connected to the limiting member 700b. The lug portion 410 is between the connected limiting member 700b and the auxiliary limiting member 1200. For example, the limiting member 700b includes confining protrusions 750 protruding from top surfaces of the abutting portions 730. The auxiliary limiting member 1200 includes an opening 1202 and confining holes 1204. When the display device 30 is assembled, the confining protrusions 750 are inserted in the confining holes 1204, and the plug 720 of the limiting member 700b passes through the opening 410H of the lug portion 410 and the opening 1202 of the auxiliary limiting member 1200.

In some embodiments of the present invention, the confining protrusions 750 of the limiting member 700b are fixed to the confining holes 1204 of the auxiliary limiting member 1200 in a clearance fit manner, a transition fit manner, or interference fit manner. In some embodiments of the present invention, the plug 720 of the limiting member 700b are fixed to the opening 1202 of the auxiliary limiting member 1200 in a clearance fit manner, a transition fit manner, or interference fit manner.

Figure 18:
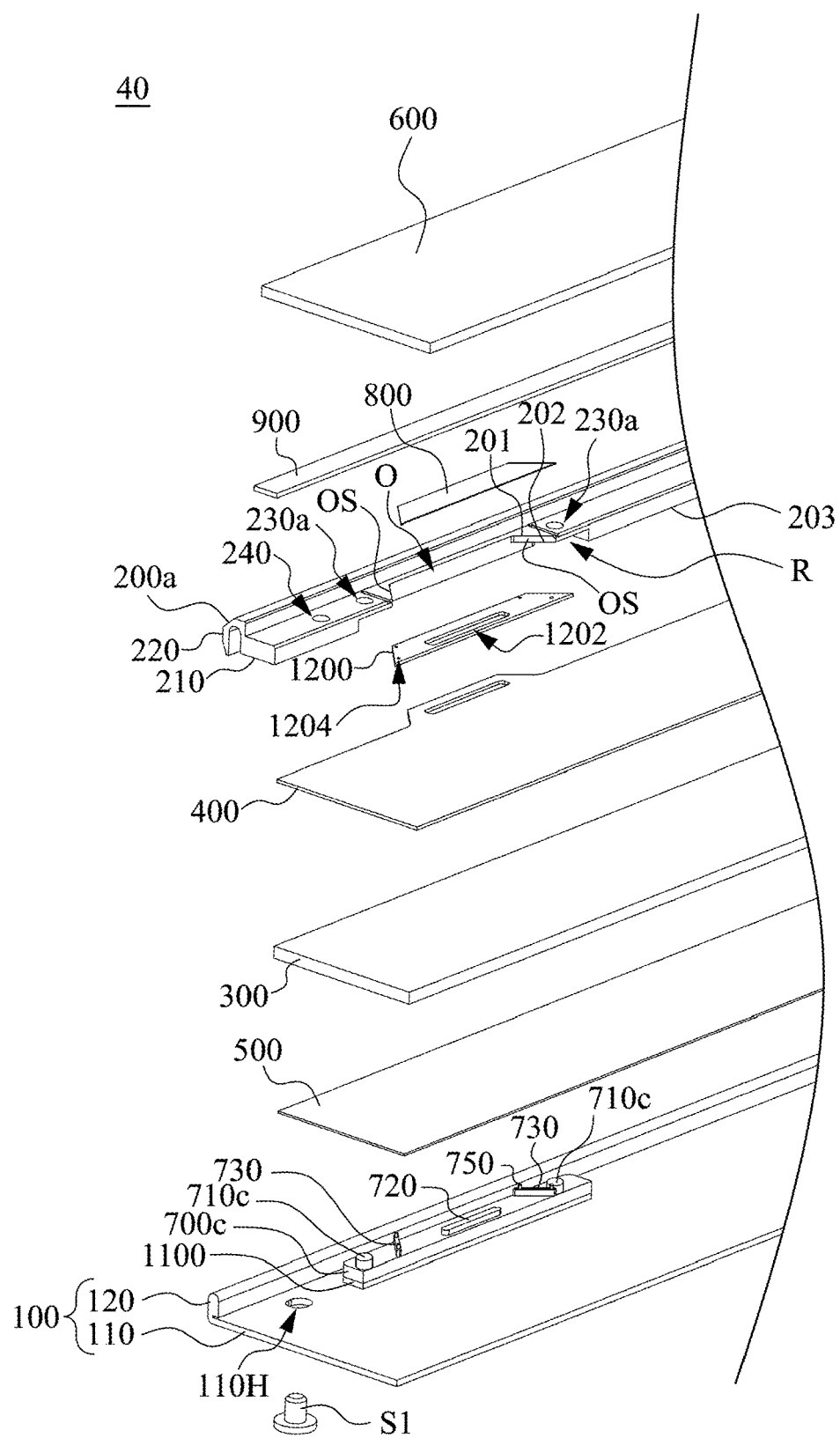
FIG. 18 is an exploded view of a display device in accordance with some embodiments of the present invention.

FIG. 18 is an exploded view of a display device 40 in accordance with some embodiments of the present invention. The display device 40 differs from the aforementioned display device 30 at least in that the limiting member 700c is fixed to the back plate 100 and the display device 40 further includes an auxiliary limiting member 1200 detachably connected to the limiting member 700b. For example, the limiting member 700c can be adhered to the top surface of the bottom plate 110 of the back plate 100. The display device 40 may also include an adhesive layer 1100 between the limiting member 700c and the top surface of the bottom plate 110, so as to adhere them together. In addition, the lug portion 410 is between the connected limiting member 700c and the auxiliary limiting member 1200. For example, the limiting member 700c includes confining protrusions 750 protruding from top surfaces of the abutting portions 730. The auxiliary limiting member 1200 includes an opening 1202 and confining holes 1204. When the display device 30 is assembled, the confining protrusions 750 are inserted in the confining holes 1204, and the plug 720 of the limiting member 700c passes through the opening 410H of the lug portion 410 and the opening 1202 of the auxiliary limiting member 1200.

Moreover, in embodiments depicted in FIG. 18, the second fixing structures 710c of the limiting member 700c are pin structures, and the first fixing structures 230a of the middle frame 200a are holes. The pin structures can be fixed into the holes in a clearance fit manner, a transition fit manner, or interference fit manner. In some embodiments of the present invention, the confining protrusions 750 of the limiting member 700c are fixed to the confining holes 1204 of the auxiliary limiting member 1200 in a clearance fit manner, a transition fit manner, or interference fit manner. Other elements as shown in FIG. 18 are described previously and thus are not repeatedly discussed for the sake of brevity.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A display device, comprising:
    a back plate comprising a bottom plate and a sidewall protruding from the bottom plate;
    a middle frame comprising a first frame body over the bottom plate and a second frame body covering the sidewall, the first frame body having two opposite surfaces and an opening penetrating through the opposite surfaces;
    a display panel fixed to the middle frame;
    an optical film comprising a lug portion placed in the opening of the middle frame, wherein the optical film has a top surface located at a level height between a bottom surface of the first frame body and a top surface of the first frame body; and
    a limiting member detachably connected to the middle frame, and connected to the lug portion of the optical film via the opening of the middle frame, wherein the lug portion is placed between the limiting member and the display panel;
    wherein a base of the limiting member is confined by the middle frame and the bottom plate.

2. The display device of claim 1, wherein the opening of the middle frame has two opposite sidewalls, the limiting member comprises two abutting portions respectively abutting the opposite sidewalls of the opening of the middle frame.

3. The display device of claim 2, wherein the limiting member comprises a plug between the abutting portions, and the plug is inserted in an opening in the lug portion.

4. The display device of claim 2, wherein the limiting member comprises a plug between the abutting portions and surrounded by the lug portion.

5. The display device of claim 1, wherein the display panel is adhered to one of the opposite surfaces of the middle frame.

6. The display device of claim 5, wherein the limiting member comprises a base and a plug protruding from the base, the plug is inserted in an opening in the lug portion, and the base is further away from the surface to which the display panel is adhered than the plug being.

7. The display device of claim 1, wherein the limiting member comprises a base and a plug protruding from the base, the plug is inserted in an opening in the lug portion, and the base is closer to the bottom plate of the back plate than the plug being.

8. The display device of claim 1, wherein the limiting member extends across the opening of the middle frame.

9. The display device of claim 1, wherein the second frame body continuously wraps around the sidewall of the back plate.

10. The display device of claim 1, wherein the optical film non-overlaps the middle frame in a direction perpendicular to a largest surface of the optical film.

11. The display device of claim 1, wherein the middle frame has a recess formed in a backside surface of the first frame body facing the bottom plate, and the base of the limiting member has opposite longitudinal ends in contact with opposite surfaces of the recess, respectively.

12. A method of assembling a bezel-less display device, the bezel-less display device comprising a back plate, a middle frame, an optical film, at least one limiting member and a display panel, the method comprising:
    orienting the middle frame in a face-down fashion;
    fastening the limiting member to the middle frame;
    fastening the back plate to the middle frame, comprising covering a sidewall of the back plate with a portion of the middle frame;
    orienting the back plate and the middle frame in a face-up fashion;
    after fastening the limiting member to the middle frame, aligning at least one lug portion of the optical film with the at least one limiting member, followed by lowering the optical film such that the at least one limiting member passes through the at least one lug portion; and
    adhering an edge of the display panel to the middle frame.

13. A method of dissembling a bezel-less display device, the bezel-less display device comprising a back plate, a middle frame, an optical film, at least one limiting member and a display panel, the method comprising:
    orienting the bezel-less display device in a face-down fashion;
    removing the back plate from the middle frame along a removing direction, comprising separating a sidewall of the back plate from a portion of the middle frame that continuously wraps around the sidewall;
removing the at least one limiting member from the middle frame along the removing direction; and
removing at least one lug portion of the optical film from where the at least one limiting member is removed, followed by removing the optical film from the bezel-less display device without removing the display panel.

* * * * *